United States Patent [19]
Vaccari

[11] Patent Number: 5,719,364
[45] Date of Patent: Feb. 17, 1998

[54] REVERSER SWITCH

[75] Inventor: Kenneth J. Vaccari, Natick, Mass.

[73] Assignee: Joseph Pollak Corporation, Boston, Mass.

[21] Appl. No.: 528,476

[22] Filed: Sep. 14, 1995

[51] Int. Cl.⁶ .................................................. H01H 3/16
[52] U.S. Cl. .................. 200/61.27; 200/61.3; 200/61.34; 335/190
[58] Field of Search ........................... 200/61.27–61.38, 200/61.54, 61.88–61.91; 335/185–204

[56] References Cited

U.S. PATENT DOCUMENTS

| | | | |
|---|---|---|---|
| 4,058,797 | 11/1977 | Sekiguchi et al. | 200/61.27 X |
| 4,097,700 | 6/1978 | Okazaki | 200/61.27 |
| 4,363,249 | 12/1982 | Stugart | 200/61.91 X |
| 4,393,360 | 7/1983 | Arakawa et al. | 335/186 X |
| 4,801,770 | 1/1989 | Yukitomo et al. | 200/61.27 |
| 4,855,542 | 8/1989 | Furuhashi et al. | 200/61.27 |
| 4,902,860 | 2/1990 | Maeda | 200/61.27 |
| 4,939,540 | 7/1990 | Kamada et al. | 335/190 |
| 5,068,633 | 11/1991 | Maeda | 335/190 |
| 5,216,399 | 6/1993 | Kamada et al. | 335/190 |

*Primary Examiner*—J. R. Scott
*Attorney, Agent, or Firm*—Kenway & Crowley

[57] ABSTRACT

An auxiliary reverser switch for a vehicle which includes a housing mounted in the vehicle in proximity to the operator and having a lever for selecting FORWARD, NEUTRAL and REVERSE positions for vehicle movement. The reverser switch is in addition to a standard range controller having a PARK and other positions and overrides control by the range controller only when a solenoid electrically connected in series with the ignition switch, the range controller, and the reverser switch is energized. The lever is mechanically connected to a rotor which breaks and establishes electrical contact to determine the direction of vehicle travel. The switch is self-canceling in that the lever is automatically returned to a HOME position displaced from the NEUTRAL position upon movement of the range controller to the PARK position or turning off the ignition switch.

3 Claims, 2 Drawing Sheets

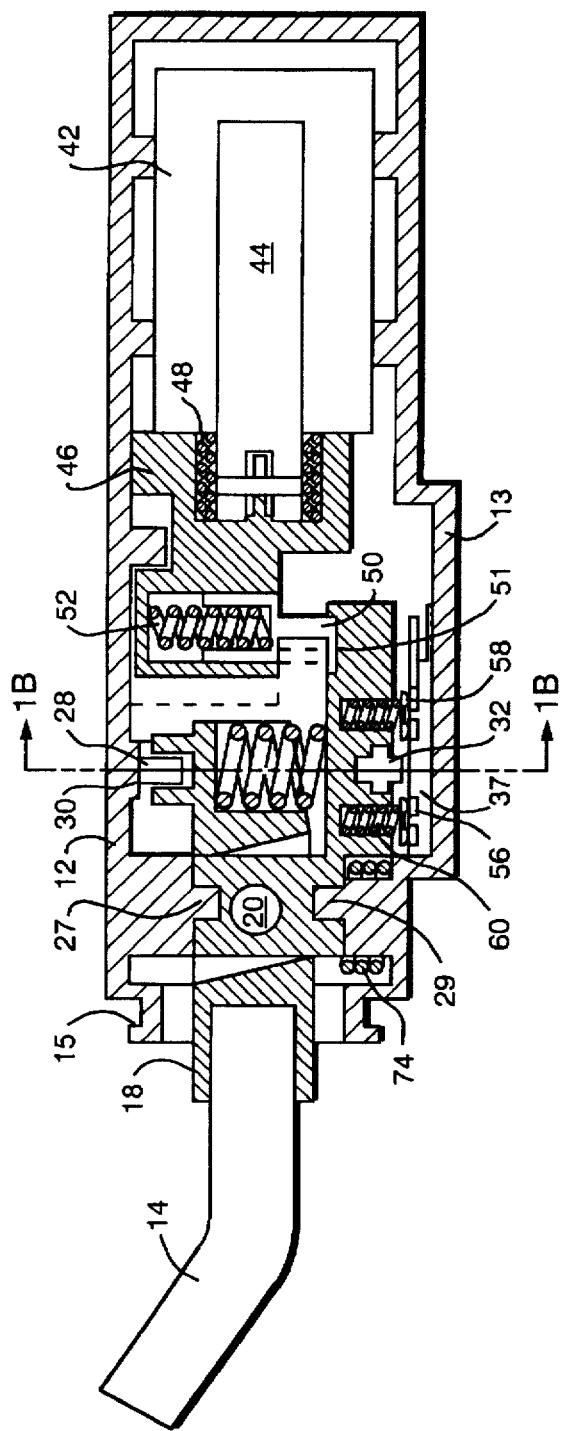
FIG. 1
FIG. 1A
FIG. 1B

REVERSER SWITCH

REVERSER SWITCH

This invention relates in general to vehicles which require frequent changes in travel direction from forward to reverse in connection with their operation. More particularly, the invention involves a self-cancelling lever switch for safely and rapidly reversing the direction of vehicle travel.

BACKGROUND OF THE INVENTION

There are some operations, particularly in construction and industrial applications, in which the travel direction of a vehicle must be frequently reversed. An obvious example is front-loading where the vehicle advances to force a scoop into a supply pile and then retreats and turns to unload the scoop into a truck. The constant shifting of gears often accompanied by a need to steer the vehicle simultaneously becomes difficult for the vehicle driver. Usually, the gear selection device like those in more conventional work vehicles is a single range control to select one of several forward positions, a reverse, or a park gear position as desired. The single range control with its multiple positions is not intended for quick and easy back-and-forth movements and, in fact, is designed not to be prone to accidental gear changes. Due to the inconvenience and effort required to make the frequent direction changes, it has long been recognized by operators that relief from the constant and repetitious manual shifting of the standard control would be a welcome advance.

It is therefore an object of the present invention to provide a convenient and safe travel-reversing control for vehicles which require frequent to-and-fro movements in their operations.

Another object is to simplify and reduce the difficulty of operation of vehicles such as front-end loaders and forklift trucks.

A further object is the avoidance of operator fatigue in the use of vehicles in construction and industrial applications.

A still further object is to provide an automatic self-canceling reversing switch for a vehicle.

SUMMARY OF THE INVENTION

These and other useful objects are attained by providing in addition to the standard gear selector a separate auxiliary control for reversing travel direction of a vehicle. The auxiliary control may be mounted for left-hand operation on the steering column of the vehicle at a point opposite the standard control. Basically, the added control is a three-position reverser switch having FORWARD, NEUTRAL, and REVERSE positions in one operating plane and a lock-out HOME position aligned with NEUTRAL but displaced from the operating plane. During normal working operation, the reverser switch overrides the standard controller. However, when the standard controller is placed in the PARK position or when the ignition switch is turned to OFF, the reverser switch automatically returns to the lock-out HOME position. Enabling of the reverser switch to control direction of vehicle travel can only be resumed by turning the ignition switch to ON, placing the standard range controller in a position other than PARK, and manually moving the reverser switch into its operating plane. A solenoid which is in circuit with the ignition switch and the standard controller must be energized as a pre-condition for the reverser switch to assume control. Thus, undesired vehicle movement at a restart of the engine is avoided. A combination of springs is provided for self-cancelling of the reverser switch and returning of the lever to the HOME position.

For a better understanding of the present invention, together with other objects, features and advantages, reference should be made to the following description of a preferred embodiment which should be read in conjunction with the drawing in which:

DESCRIPTION OF DRAWING

FIG. 1 is a sectional view of a reverser switch built in accordance with the present invention;

FIGS. 1A and 1B are schematic fragmentary cross-sectional views of the reverser switch lockout mechanism FIG. 1B being taken along the lines 1B—1B of FIG. 1;

DESCRIPTION OF PREFERRED EMBODIMENT

Figure 3:
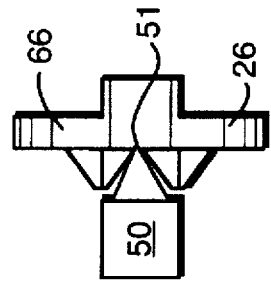
FIGS. 2 and 3 are fragmentary diagrams of the rotor detents of the switch of FIG. 1 showing components as they are deployed when the reverser switch is in NEUTRAL or HOME positions.

In the sectional view of FIG. 1, there may be seen a housing 12 of generally oblong cross-section to which a cover 13 may be attached by conventional means. At the left end of the housing as seen in FIG. 1, there is mounted an actuating lever 14. The lever 14 fits into a pivot member 18 which is pivotable to a limited degree in the plane of the drawing about a pin pivot 20 between a HOME and a NEUTRAL position. The pivot member 18 engages a rotor 26 (FIGS. 1A, 1B, and 3–5) when the lever 14 is lifted to the NEUTRAL position. The lever 14 is also movable laterally along with the pivot member 18 and the rotor 26 in a second plane at an angle to the plane of the drawing between FORWARD, NEUTRAL, and REVERSE positions. Such lateral movement is about an axis defined by the studs 27 and 29 formed on the housing 12 and the cover 13, respectively.

In FIGS. 1A and 1B, the lock-out system for the lever 14 involving the HOME and NEUTRAL positions is shown. A groove 30 is formed in the interior upper wall of the housing 12. When the lever is in the HOME position, a roller 28 carried by the pivot member 18 is held in the groove 30 by the force of a compression spring 24 which is disposed between the rotor 26 and the pivot 18. The roller 28 may be dislodged by lifting the lever 14 to the NEUTRAL position. The rotor 26 in its pivoting motion about the axis defined by the studs 27 and 29 is supported from below by a second roller 32 which bears upon an insulating block 37 at the bottom of the housing.

The rotor is the heart of the switching elements which are moved by the lever 14 as explained below.

Mounted in the right-hand end of the housing as seen in FIG. 1, is a solenoid 42, which is in electrical circuit relationship with the vehicle ignition system and the standard range controller as well as the rotor position as determined by the lever 14. The solenoid 42 has a shaft 44 axially reciprocable within the solenoid core. Pinned to the solenoid shaft 44 is a slider 46. A slider escape spring 48 disposed between the end of the solenoid and a shoulder formed on the slider normally displaces both the shaft 44 and the slider 46 to the left. The slider carries a detent plunger 50 to which force in a downward direction as shown is applied by a plunger spring 52. The plunger tip bears against the top surface of the rotor 26. Terminals 56 are mounted on the insulating base 37 of the housing and are connected to circuits which energize the solenoid 42 and also control electrically the gears which determine the direction of travel of the vehicle. The wipers 58 carried beneath the rotor 26 are maintained in contact with the terminals 56 by the force of the wiper springs 60 which are recessed in the rotor 26. As noted above, after the lever arm 14 is lifted from the lock-out HOME position, the reverser switch is enabled and the lever 14 may be moved laterally through the FORWARD, NEUTRAL and REVERSE positions as the rotor 26 pivots about the axis passing radially through the opposing studs 27 and 29.

The rotor 26 also carries a detent track 66 shown in outline in FIGS. 2–5 and engageable by the detent plunger 50 when the solenoid 42 is energized. Also, a groove 51 is formed in the top surface of the rotor 26 to engage the downwardly extending tip of the plunger 50 when the lever is in the NEUTRAL or HOME position.

Figure 2:
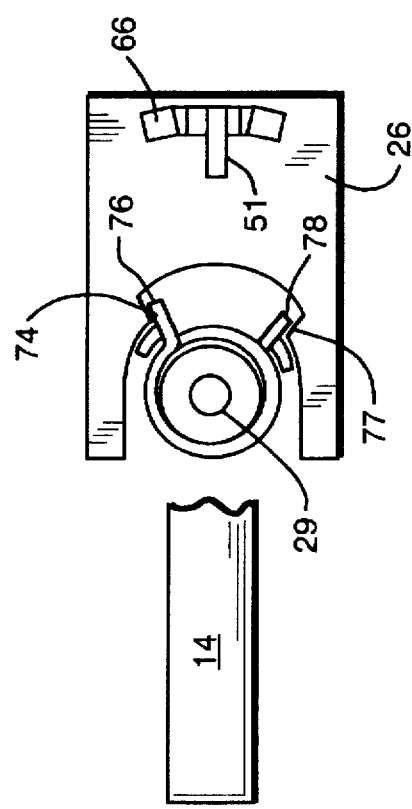
Figure 4:
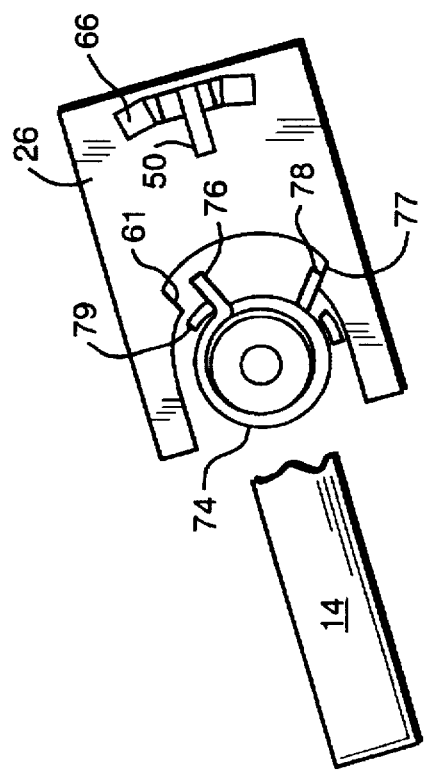

There is wound about the upstanding stud 29 of the cover 13 a torsion spring 74. The torsion spring 74 has ends 76 and 78 which engage shoulders formed on an arcuate portion of the rotor 26. In FIG. 2, it may be seen that when the lever 14 is in either the NEUTRAL or HOME position the torsion spring ends bear equally upon adjacent shoulders of an arcuate portion of the rotor 26. In FIG. 4, on the other hand, the spring end 78 exerts force against the shoulder 77 tending to urge the rotor 26 in a clockwise direction, the spring end 76 being against its stop 79 and the lever 14 being in the REVERSE position. Were the lever to be in the FORWARD position, the spring end 76 would be against the shoulder 81, tending to urge the rotor 26 in a counterclockwise direction.

Figure 5:
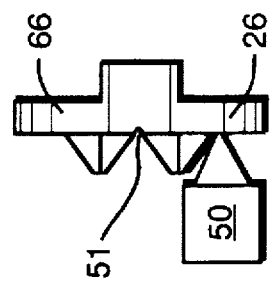
FIGS. 4 and 5 are similar fragmentary diagrams showing rotor components when the switch is in the REVERSE position.

Detent action of the switch is indicated in FIGS. 3 and 5. When the lever is moved from the HOME to the NEUTRAL position as described above with reference to FIG. 2, the solenoid is energized and the plunger tip 50 is pulled to the right to engage the detent track 66 and the circuits controlling vehicle direction are closed by the contact of the wipers 58 with the contacts 56. The groove 51 is formed in the rotor surface in alignment with the central detent of the track 66, and it is this groove which maintains the alignment of the plunger centrally of the rotor when the lever is in the HOME or NEUTRAL position.

In FIG. 5, there is shown the detent action which occurs with the lever in REVERSE as illustrated in FIG. 4. It will be noted that the lever is retained in that position by the action of the spring 52 on the plunger tip which is against the surface of the rotor 26, there being no groove at that point.

As long as the solenoid 42 is energized, the reverser switch permits rapid and simple reversal of direction from FORWARD to REVERSE and from REVERSE to FORWARD by manipulating the lever 14. When the solenoid is deenergized, the spring 48 forces the slide 46 to the left, carrying the detent plunger 50 out of the detent track 66 and disabling the reverser switch mechanism. The lever 14 then returns to the HOME position. The solenoid is initially energized to commence operation by lifting the lever to the NEUTRAL position after turning the ignition switch to the ON position and placement of the gear selector of the standard range control in a position other than the PARK position. The energized solenoid then retracts its shaft, causing the slider and detent plunger 50 to be pulled to the right, the plunger then engaging the detent track on the rotor 26 as shown in FIG. 3. When the lever is lifted, the roller 28 is dislodged from the groove 30 and the lever 14 then may be moved laterally to the FORWARD or REVERSE positions, thus changing the electrical switching state of the wipers 58 by relocating them to adjacent terminals 56, causing shifting of gears to change direction of vehicle travel.

When the lever is moved laterally, it turns the rotor 26 which winds the torsion spring 74 more tightly in either direction by the action of the arcuate portion of the rotor 26 against the spring ends 76 or 78. In other words, shifting from NEUTRAL to FORWARD causes a tightening of the torsion spring in one direction and shifting from NEUTRAL into the REVERSE position causes tightening of the torsion spring in the opposite direction.

When the solenoid is deenergized, the slider and the detent plunger are ejected from the detent track under the expanding forces of the slider spring 48. The slider and the detent plunger are moved to the left as seen in FIG. 4 until the detent plunger clears the detent track. The tip of the plunger being engaged in the groove 51 assures self-alignment of the rotor in the central NEUTRAL position. At that point, the rotor 26 is itself released and the torsion spring unwinds, forcing the rotor and lever to the NEUTRAL position. The roller 28 then reenters the groove 30 under the influence of the spring 24, returning the lever 14 to the HOME position.

When the solenoid is reenergized as with a new start with the standard range controller in a position other than PARK, ignition ON and the lever moved from the HOME position, the slider and detent plunger return to the detent track. The groove 51 cut in the rotor accurately guides the plunger once more into the detent track.

It should be noted that in normal operation the solenoid is energized, frequently for long periods. During those periods, the slider 46 and the detent plunger 50 are pulled into the detent track. The lever 14, once lifted, can be moved laterally to the FORWARD or REVERSE positions, changing the electrical switching state by relocating the rotor wipers 58 relative to the terminals 56. The lever 14 drives the rotor 26 to wind the torsion spring 74 in either direction, FORWARD or REVERSE. The detent plunger 50 is urged against the detent track 66 by the spring, causing a temporary hold of the lever position until the lever is moved manually.

When the solenoid is deenergized as by the placement of the standard range controller in PARK, shutting off the ignition, or manipulating the lever, first the slider spring 48 takes over pushing the slider and detent plunger to the left. Next, after the detent plunger clears the detent track, the torsion spring 74 centers the rotor at NEUTRAL and finally the lever arm is returned to the HOME position by the compression spring 24.

What is claimed is:

1. An auxiliary reverser switch arrangement for a vehicle having a conventional ignition system ON and OFF positions and a standard range controller having a plurality of positions including a PARK position comprising a housing mounted on the steering column of said vehicle, a solenoid disposed in said housing a plurality of switch terminals mounted in said housing, a rotor disposed for lateral rotation in said housing and having switch wipers cooperating with a first plurality of said switch terminals to make and break electrical circuits controlling the direction of travel of said vehicle and with a second plurality of said terminals to energize said solenoid in series with said ignition system and said standard range controller, and a manually operable lever having FORWARD, REVERSE and NEUTRAL positions and a HOME position displaced from said NEUTRAL position, said lever being mechanically connected to said rotor, travel of said vehicle being in accordance with said lever positions only during energization of said solenoid after turning said ignition to said ON position and placement of said range controller in a position other than PARK.

2. An auxiliary reverser switch arrangement for a vehicle as defined in claim 1 further including a torsion spring bearing on and normally retaining said rotor in a position in which said lever is in a NEUTRAL position and a compression spring normally urging said lever into said HOME position, said lever being manually movable from said HOME position to said NEUTRAL position.

3. An auxiliary reverser switch arrangement for a vehicle as defined in claim 2 further including means supporting said rotor for said lateral rotation in said housing, said supporting means including a first roller mounted beneath said rotor and a second roller mounted above said rotor, said second roller being movable relative to said rotor and being urged toward said housing by said compression spring, said housing having an internal groove formed therein to accept said second roller when said lever is in said HOME position.

* * * * *